United States Patent
Den Hartog

(10) Patent No.: US 9,602,554 B2
(45) Date of Patent: *Mar. 21, 2017

(54) SYSTEM, METHOD, NETWORK ENTITY AND DEVICE FOR CONNECTING A DEVICE TO A COMMUNICATIONS NETWORK

(71) Applicant: TELEFONAKTIEBOLAGET L M ERICSSON (PUBL), Stockholm (SE)

(72) Inventor: Jos Den Hartog, Capelle a/d Ijssel (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

This patent is subject to a terminal disclaimer.

(21) Appl. No.: 14/789,175

(22) Filed: Jul. 1, 2015

(65) Prior Publication Data

US 2015/0304365 A1    Oct. 22, 2015

Related U.S. Application Data

(63) Continuation of application No. 13/997,476, filed as application No. PCT/EP2010/070707 on Dec. 23, 2010, now Pat. No. 9,112,865.

(51) Int. Cl.
| | | |
|---|---|---|
| *G06F 15/16* | (2006.01) | |
| *G06F 17/30* | (2006.01) | |

(Continued)

(52) U.S. Cl.
CPC .... *H04L 65/1069* (2013.01); *G06F 17/30867* (2013.01); *G06Q 20/202* (2013.01);
(Continued)

(58) Field of Classification Search
CPC combination set(s) only.
See application file for complete search history.

(56) References Cited

U.S. PATENT DOCUMENTS 6,026,291 A * 2/2000 Carlsson ............... H04M 15/00
455/405
2003/0176182 A1  9/2003 Cerami et al.
(Continued)

FOREIGN PATENT DOCUMENTS

| EP | 1689145 | 8/2006 |
| EP | 208616 A1 * | 8/2009 |
| EP | 2086167 | 8/2009 |

OTHER PUBLICATIONS

International Search Report for PCT/EP2010/070707, mailed Dec. 7, 2011.

*Primary Examiner* — Fatoumata Traore
(74) *Attorney, Agent, or Firm* — Nixon & Vanderhye P.C.

(57) ABSTRACT

The system includes a device of a plurality of devices and a network entity for connecting the device to a communications network. The device is arranged for attempting to access the network while providing an identification of the device to the network entity. The network entity is arranged for receiving the access attempt from the device, and determining the identification of the device. The network entity determines an identification of a subscription associated with the device from a first database of the system. The network determines whether the identified subscription has the device associated therewith in a second database. The network entity allows the device to connect to the network entity or prevents the device from connecting to the communications network depending on the above determinations.

12 Claims, 7 Drawing Sheets

(51) Int. Cl.
*H04L 29/06* (2006.01)
*G06Q 20/20* (2012.01)

(52) U.S. Cl.
CPC ............ *H04L 63/10* (2013.01); *H04L 63/102* (2013.01); *H04L 65/1016* (2013.01)

(56) References Cited

U.S. PATENT DOCUMENTS

2007/0287433 A1   12/2007  Wollersheim et al.
2011/0038319 A1*   2/2011  Shi .................... H04L 29/12188
                                                             370/328

* cited by examiner

SYSTEM, METHOD, NETWORK ENTITY AND DEVICE FOR CONNECTING A DEVICE TO A COMMUNICATIONS NETWORK

This application is a Continuation of U.S. patent application Ser. No. 13/997,476, filed on Jun. 24, 2013, which is the U.S. national phase of International Application No. PCT/EP2010/070707 filed on Dec. 23, 2010, which designated the U.S., the entire contents of each of which are hereby incorporated by reference.

TECHNICAL FIELD

The invention relates to a method, network entity and device for connecting a device to a communications network. More specifically the invention relates to connecting a device not having a subscription to a communications network.

BACKGROUND

Nowadays, devices that want to use a mobile internet connection, and having no access to a wireless access point, must be equipped with a module (e.g. a 2G or 3G module) that offers mobile internet access via a communication network. Such a device also requires a subscription, e.g. arranged via a Subscriber Identity Module (SIM) card. A subscriber has a subscription at an operator of the communication network. This operator has a Radio Access Network (RAN), which provides Radio Access, and a Service Network, which provides amongst others services and billing. When this subscriber visits another country, it needs to get Radio Access via a Visiting RAN. In order to get this access, the operator of the Visiting RAN must have a roaming agreement with the operator with which the subscriber has the subscription.

A subscriber can also have a subscription at a Mobile Virtual Network Operator (MVNO). This MVNO can have an own Service Network, but has no own RAN. So, the MVNO always needs roaming agreements with one or more operators.

A device manufacturer or vendor can design its device to function in a similar way.

When a device manufacturer or vendor designs its devices to function in said similar way, problems or disadvantages may arise. The device manufacturer or vendor must provide Subscriber Identity Modules (SIM's). When these SIM's are provided by an operator, the device manufacturer or vendor must have arrangements with this operator and the buyer of the device must become subscriber of that operator. When these SIM's are provided by the device manufacturer or vendor (which then becomes MVNO) the device manufacturer or vendor must have roaming agreements for countries where the device will be sold, and the buyer of the device must become subscriber of this MVNO. The user of such a device may need an (prepaid or postpaid) account that is related to the SIM in this device. If the owner has many of such devices, he has a multitude of such accounts, and e.g. in case of prepaid accounts each one needs a deposit. A device equipped with such a module and SIM, must register itself. At registration, relations are established and the device becomes reachable at a public identity. These procedures create an overhead for a device that only needs to send data.

SUMMARY

It is an object of the invention to allow a class of electronic devices to connect to a communications network, such as mobile internet, whereby at least some of the above disadvantages are obviated. Thereto, according to the invention is provided a system including a device of a plurality of devices and a network entity for connecting the device to a communications network. The device includes a transmitting unit arranged for transmitting an access attempt to the network entity, and an indication unit arranged for indicating an identification of the device to the network entity. The network entity includes a receiving unit arranged for receiving the access attempt from the device, a first determination unit arranged for determining the identification of the device, a first accessing unit arranged for accessing a first database of the system, said first database including for each device of the plurality of devices an identification of at least one subscription associated therewith, and a second determination unit arranged for determining from the first database the identification of at least one subscription associated with the device. The network entity further includes a second accessing unit arranged for accessing a second database of the system, said second database including for each subscription of a plurality of subscriptions an identification of at least one device associated therewith, and a third determination unit arranged for determining whether the at least one subscription identified from the first database as being associated with the device has the device associated therewith in the second database. The network entity further includes a selection unit arranged for connecting the device to the communications network if the third determination unit determines that the identified at least one subscription has the device associated therewith, and preventing the device from connecting to the communications network if no identification of the device has been determined by the first determination unit, if no identification of at least one subscription associated with the device has been determined from the first database, or if not at least one identified subscription has the device associated therewith in the second database. The selection unit can also be arranged for preventing the device from connecting to the communications network if not a profile or an account of at least one identified subscription allows connecting the device to the communications network.

Hence, the identification of a subscription associated with the device, e.g. an identity of a user of the device, attempting to connect to the communications network is determined from the first database. Knowing the identification of the subscription, the second database is queried in order to determine whether the subscription associated with the device in the first database is also included in the second database and has the device associated therewith in the second database. This allows for verifying the subscription associated with the device.

According to an aspect the access attempt includes the identification of the device. Then the first determination unit is arranged for determining the identification of the device from the access attempt.

The first database is communicatively connectable to the network entity. The first database can be part of the communications network or part of the network entity. Alternatively, the first database is placed outside the communications network and outside the network entity. The second database is communicatively connectable to the network entity. The second database can be part of the communications network or part of the network entity. Alternatively, the second database is placed outside the communications network and outside the network entity.

It is possible that the first database is maintained by, or on behalf of, a manufacturer or vendor of the device. It is possible that the second database is maintained by, or on behalf of, a network operator. In that case, from the first database a subscription associated with the device is provided by, or on behalf of, the manufacturer or vendor. For the identified subscription it may be verified in the second database maintained by, or on behalf of the network operator, that the subscription is indeed known to the network operator and has the device associated therewith as far as the network operator is concerned. It may also be verified if the profile or account associated with the subscription allows the device to be connected to the communications network. This provides the advantage that malafide connection attempts can be prevented to succeed.

It will be appreciated that the user of the device need not be a human being, but may also be a further device invoking said device.

According to an aspect, the first database includes an identification, such as a hardware identification (HW-id) or Internet Protocol (IP) Multimedia Private Identity (IMPI), of the device and an identification, such as an IP Multimedia Public Identity (IMPU), of the at least one subscription.

According to an aspect, the second database includes an identification, such as an IMPU, of the subscription and an identification, such as a hardware identification (HW-id) or IMPI, of the at least one device.

According to an aspect, the device includes a worldwide unique identification, such as comprising a vendor identification and a serial number of the device. Hence, the device can be used in the system anywhere in the world without ambiguity.

According to an aspect, the system includes a plurality of second databases each associated with one of a plurality of network operators, wherein the network entity comprises a fourth determination unit arranged for determining the network operator associated with the subscription identified as associated with the device from the first database, and a second selection unit arranged for selecting the second database associated with the determined network operator from the plurality of second databases and for adjusting the second accessing unit to access the second database associated with the determined network operator.

This provides the advantage that the system can identify the network operator associated with the subscription associated with the device, e.g. using the first database, when a plurality of network operators is available. Hence, the relationship between subscriptions of a network operator and devices associated with said subscriptions can be maintained in a dedicated second database for each network operator. This provides the advantage that the associations between subscriptions and devices can be stored in a distributed fashion. This also allows for reduced network traffic towards and from each second database.

According to an aspect, the system includes a plurality of first databases each associated with one of a plurality of device group identifiers, wherein the network entity comprises a fifth determination unit arranged for determining a device group identifier of the connecting device, and a third selection unit arranged for selecting the first database associated with the determined device group identifier from the plurality of first databases and for adjusting the first accessing unit to access the first database associated with the determined device group identifier. This provides the advantage that the device identifications can be distributed over a plurality of first databases. In an embodiment, the device group identifier is indicative of a producer of the device, a vendor of the device, a provider of the device, a type of device, a country in which the device is used, or the like.

This allows for distributed storage of the associations between devices and subscriptions. This also allows for reduced network traffic towards and from each first database.

In an embodiment, the communications network is an Internet Protocol Multimedia Subsystem (IMS) network. In that case the second database can be associated with, or incorporated in, a Home Subscriber Server (HSS).

The invention also relates to a network entity for connecting a device of a plurality of devices to a communications network. The network entity, includes a receiving unit arranged for receiving an access attempt from a connecting device, a first determination unit arranged for determining an identification of the connecting device from the access attempt, a first accessing unit arranged for accessing a first database, said first database including for each device of the plurality of devices an identification of at least one subscription associated therewith, a second determination unit arranged for determining from the first database an identification of at least one subscription associated with the connecting device, a second accessing unit arranged for accessing a second database, said second database including for each subscription of a plurality of subscriptions an identification of at least one device associated therewith, a third determination unit arranged for determining whether the at least one subscription identified from the first database as being associated with the connecting device has the device associated therewith in the second database, and a selection unit. The selection unit is arranged for connecting the connecting device to the communications network if the third determination unit determines that the identified subscription has the connecting device associated therewith, and preventing the connecting device from connecting to the communications network if no identification of the connecting device has been determined by the first determination unit, if no identification of at least one subscription associated with the connecting device has been determined from the first database, or if not at least one identified subscription has the connecting device associated therewith. The selection unit can also be arranged for preventing the connecting device from connecting to the communications network if not a profile or an account of at least one identified subscription allows connecting the connecting device to the communications network.

According to an aspect, the network entity further includes a fourth determination unit arranged for determining the network operator associated with the identified subscription associated with the connecting device, and a second selection unit arranged for selecting the second database associated with the determined network operator from a plurality of second databases each associated with one of a plurality of network operators.

According to an aspect, the network entity further includes a fifth determination unit arranged for determining a device group identifier of the connecting device, and a third selection unit arranged for selecting the first database associated with the determined device group identifier from a plurality of first databases each associated with one of a plurality of device group identifiers.

The invention also relates to a method for connecting a device of a plurality of devices to a communications network. The method includes:
  providing a first database including, for each device of the plurality of devices, an identification of at least one subscription associated therewith,
  providing a second database including, for each subscription of a plurality of subscriptions, an identification of at least one device associated therewith, having the device attempt to access the communications network,
retrieving an identification of the device from the access attempt,
assessing from the first database an identification of the at least one subscription associated with the device,
assessing from the second database whether the subscription identified from the first database as being associated with the device has the device associated therewith in the second database, and
connecting the device to the communications network if the identified subscription has the device associated therewith, and
preventing the device from connecting to the communications network if no identification of the device has been determined, if no identification of a subscription associated with the device has been determined, or if the identified subscription does not have the device associated therewith.

According to an aspect, the method for connecting a device of a plurality of devices to a communications network, includes:
receiving, by a network entity of the communications network, an access attempt to the communications network from a device,
retrieving, by the network entity, an identification of the device from the access attempt,
accessing, by the network entity, a first database (6) including, for each device of the plurality of devices, an identification of at least one subscription associated therewith,
assessing, by the network entity, from the first database (6) the identification of the at least one subscription associated with the device,
accessing, by the network entity, a second database (8) including, for each subscription of a plurality of subscriptions, an identification of at least one device associated therewith,
assessing, by the network entity, from the second database (8) whether the subscription identified from the first database as being associated with the device has the device associated therewith in the second database, and
connecting the device to the communications network if the identified subscription has the device associated therewith in the second database, and
preventing the device from connecting to the communications network if no identification of the device has been determined, if no identification of a subscription associated with the device has been determined, or if the identified subscription does not have the device associated therewith. The method can also include preventing the device from connecting to the communications network if a profile or an account of the identified subscription does not allow connecting the device to the communications network.

According to an other aspect, the method for connecting a device of a plurality of devices to a communications network includes:
transmitting unit, by the device, an access attempt to a network entity of the communications network,
indicating, by the device, an identification of the device,
accessing, by the device a first database of the system, said first database including for each device of a plurality of devices an identification of a subscription associated therewith,
determining, by the device, from the first database the identification of a subscription associated with the device,
accessing, by the device, a second database of the system, said second database including for each subscription of a plurality of subscriptions an identification of at least one device associated therewith,
determining, by the device, whether the subscription identified from the first database as being associated with the device has the device associated therewith in the second database, and
instructing, e.g. by the device, the network entity to
allow the device to connect to the communications network if the device determines that the identified subscription has the device associated therewith, and to
prevent the device from connecting to the communications network if no identification of the device has been determined, if no identification of a subscription associated with the device has been determined from the first database, or if the identified subscription does not have the device associated therewith in the second database.

The method can also include instructing the network entity to prevent the device from connecting to the communications network if a profile or an account of the identified subscription does not allow connecting the device to the communications network.

According to an aspect, the method further includes assessing whether a profile or an account of the identified subscription allows the device to connect to the communications network, and only if the profile and/or account allows connecting, allowing the device to connect to the communications network.

In an embodiment, the method includes assessing whether a network operator associated with the subscription is servicing, or having roaming agreement with, the communications network. In a more elaborate embodiment, the method includes debiting an account of the subscription associated with the device for connection of the device with the communications network.

The invention also relates to a computer program product including software code portions arranged for performing, when run on a programmable apparatus, the steps of
providing a first database including, for each device of the plurality of devices, an identification of at least one subscription associated therewith,
providing a second database including, for each subscription of a plurality of subscriptions, an identification of at least one device associated therewith,
having the device attempt to access the communications network,
retrieving an identification of the device from the access attempt,
assessing from the first database an identification of the at least one subscription associated with the device,
assessing from the second database whether the subscription identified from the first database as being associated with the device has the device associated therewith in the second database, and
connecting the device to the communications network if the third determination unit determines that the identified subscription has the device associated therewith, and
preventing the device from connecting to the communications network if no identification of the device has been determined by the first determination unit, if no identification of a subscription associated with the device has been determined from the first database, or if the identified subscription does not have the device associated therewith in the second database. The computer program product can also be arranged to perform, when run on a programmable apparatus, the step of preventing the device from connecting to the communications network if a profile or an account of the identified subscription does not allow connecting the device to the communications network.

The invention also relates to the device of the system according to the invention. The device is arranged to attempt to connect to the communications network.

In an embodiment, the device includes a transmitting unit arranged for transmitting an access attempt to a network entity of the communications network, and an indication unit arranged for indicating an identification of the device to the network entity.

In an embodiment, the device includes a transmitting unit arranged for transmitting an access attempt to a network entity of the communications network, an indication unit arranged for indicating an identification of the device to the network entity, and an instruction unit. The instruction unit is arranged for instructing the network entity to determine the identification of the device,
access a first database of the system, said first database including for each device of a plurality of devices an identification of a subscription associated therewith,
determine from the first database the identification of a subscription associated with the device,
access a second database of the system, said second database including for each subscription of a plurality of subscriptions an identification of at least one device associated therewith,
determine whether the subscription identified from the first database as being associated with the device has the device associated therewith in the second database,
allow the device to connect to the communications network if the network determines that the identified subscription has the device associated therewith, and
prevent the device from connecting to the communications network if no identification of the device has been determined by the network entity, if no identification of a subscription associated with the device has been determined from the first database, or if the identified subscription does not have the device associated therewith in the second database.

The instruction unit can also be arranged for instructing the network entity to prevent the device from connecting to the communications network if a profile or an account of the identified subscription does not allow connecting the device to the communications network.

In an embodiment, the device includes a transmitting unit arranged for transmitting an access attempt to a network entity of the communications network, an indication unit arranged for indicating an identification of the device, a first accessing unit arranged for accessing a first database of the system, said first database including for each device of a plurality of devices an identification of a subscription associated therewith, a second determination unit arranged for determining from the first database the identification of a subscription associated with the device, a second accessing unit arranged for accessing a second database of the system, said second database including for each subscription of a plurality of subscriptions an identification of at least one device associated therewith, a third determination unit arranged for determining whether the subscription identified from the first database as being associated with the device has the device associated therewith in the second database, and an instruction unit. The instruction unit is arranged for instructing the network entity to allow the device to connect to the communications network if the third determination unit determines that the identified subscription has the device associated therewith, and to
prevent the device from connecting to the communications network if no identification of the device has been determined by the first determination unit, if no identification of a subscription associated with the device has been determined from the first database, or if the identified subscription does not have the device associated therewith in the second database.

The instruction unit can also be arranged for instructing the network entity to prevent the device from connecting to the communications network if a profile or an account of the identified subscription does not allow connecting the device to the communications network.

The device connectable to the communications network of the system, and/or using the above method may
use mobile internet, via some access network;
use only limited amounts of data transfer;
use only outgoing connections, i.e. it is not reachable but connects to internet when needed;
be produced for worldwide market, i.e. the producer of the device does not know where in the world the device will be sold;
be delivered all around the world, and preferably the vendor of the device should not need to configure the device per market;
need some payment method to pay for the wireless access, via the said access network;
can be a gift-item, e.g. provided by a shop as part of a marketing campaign;
can have an amount of credit preloaded, which credit can be used in any country where the device is sold/provided; and/or
doesn't have the means to store configuration information like the identity of the user.

BRIEF DESCRIPTION OF THE DRAWINGS

The invention will now be further elucidated by means of non-limiting examples referring to the drawings, in which.

DETAILED DESCRIPTION

Figure 1:
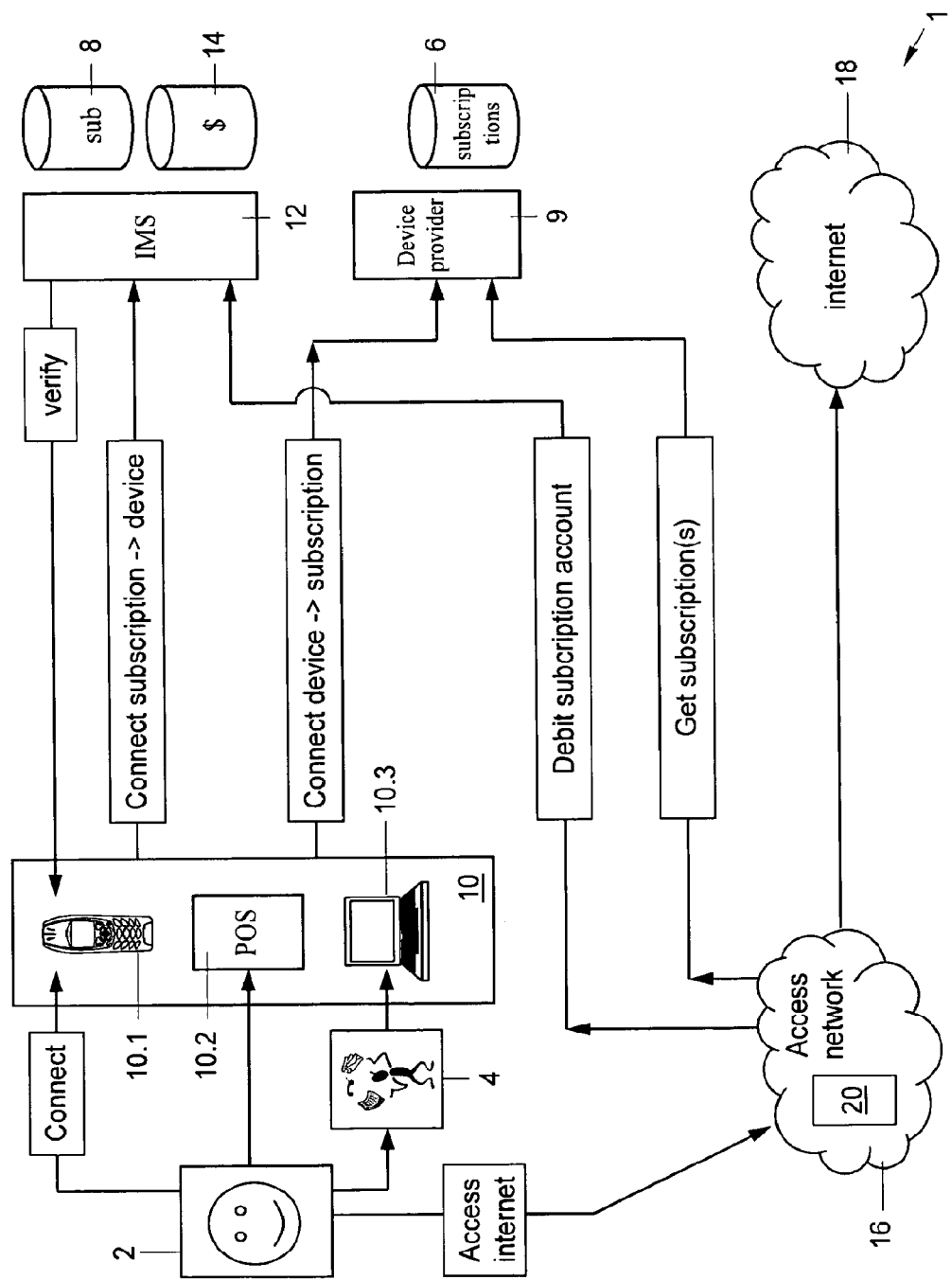
FIG. 1 is an embodiment of a communications network system.

FIG. 1 shows an embodiment of a system 1 according to the invention. The system 1 comprises a device 2. The device 2 is one of a plurality of devices 2.i. All devices of the plurality of devices 2.i can be similar, or identical, except for an identification of each device. Preferably, the device identification is a hardware identification (HW-id). In this example, the device 2 has an identification that is worldwide unique. The uniqueness can be provided by e.g. a producer/vendor-identification combined with a serial number (e.g. like a known Media Access Control (MAC) address).

The device 2 is used by a user 4. The user 4 can be a person. Alternatively, the user 4 can be a further device invoking the use of the device 2. In this example, the user 4 of the device 2 is associated with a subscription with a network operator servicing, or having a roaming agreement with, the communications network. Here, the subscription has an account that is related to a mobile phone subscription of the user. The account of the user can be debited by a third party, when agreed upon by the user.

The system 1, in this example, comprises a first database 6 where relations from the device to one or more subscriptions are maintained. The first database 6 includes for each device 2 of the plurality of devices 2.i an identification of at least one subscription associated therewith. In this example, the first database 6 is maintained by e.g. the device-provider 9, the device-producer or the device-vendor.

The system 1, in this example, further comprises a second database 8 where relations from subscription to devices are maintained. The second database 8 includes for each subscription of a plurality of subscriptions an identification of at least one device 2 associated therewith. In this example, the second database 8 is maintained by e.g. the network operator 12 of the user's mobile phone 10.1.

In this example, the system 1 further comprises an activation unit 10. The activation unit 10 can take many forms. In the example of FIG. 1, the activation unit 10 presents three types of activation entities 10.1, 10.2, 10.3. The first activation entity 10.1 is embodied as a mobile phone of the user 4. The second activation entity 10.2 is embodied as a point-of sales (POS) terminal. The third activation entity 10.3 is embodied as a personal computer, e.g. running a dedicated website.

A method exists to connect the device 2 to one or more subscriptions. In an exemplary embodiment, this method can be performed as follows.

The activation unit 10 (e.g. the phone 10.1, a point-of-sales terminal 10.2, or user 4 using a website 10.3) retrieves (e.g. visually or electronically) the identification of the device 2 and the identification of the subscription, and requests via database maintainers 9 and 12 of the first and second database 6 and 8 respectively, to create a relation between these in said databases 6 and 8. Optionally, the user 4 approves the setting. Approval may not be needed when the user 4 uses his/her own phone, associated with the subscription, to create the relation. Both the first database 6 and the second database 8 are updated to include the relation.

Once the first database 6 and second database 8 are updated, the device is able to be connected to the communications network, in this example comprising the internet 18. Thereto, the device attempts to connect to an access network 16 of the communications network. The access network 16 is that part of the communications network which provides an entry point for communication between the device and the remainder of the communications network. Upon this connection attempt, the device 4 provides its identification to the access network 16. Next, the identification of at least one subscription associated with the device 2 is retrieved, based on the device identification, from the first database. Once the identification of the at least one subscription has been obtained, it is verified with the network operator 12, based on the second database 8, whether or not at least one of the at least one subscriptions associated with the device 2 is a subscription of the network operator 12. If at least one of the at least one subscriptions associated with the device 2 is a subscription with the network operator 12, the device 4 may be granted access to the communications network, e.g. to the internet 18, by the access network 16.

More in general, a method for connecting the device 2 of the plurality of devices 2.i to a communications network includes providing the first database 6 including, for each device of the plurality of devices 2.i, an identification of at least one subscription associated therewith, providing a second database 8 including, for each subscription of a plurality of subscriptions with a network operator servicing, or having a roaming agreement with, the communications network, an identification of at least one device associated therewith, having the device 4 attempt to access the communications network, retrieving an identification of the device 4 from the access attempt, assessing from the first database 6 an identification of the at least one subscription associated with the device 2, assessing from the second database 8 whether the identified at least one subscription associated with the device 2 is a subscription with the network provider, and if the identified subscription associated with the device 2 is identified as a subscription of the network provider allowing the device 2 to connect to the communications network.

Alternatively, according to the invention a method for connecting a device 2 to a communications network, includes providing a first database 6 including, for each device 2 of a plurality of such devices, a relationship between each such device and one or more subscriptions associated with that device, providing a second database 8 including, for each subscription of a plurality of subscriptions of a network operator 12, a relationship between each such subscription and one or more devices associated with that subscription, having the device attempt to connect to the communications network, assessing from the first database 6 an identity of a subscription associated with the device, assessing from the second database 8 whether the identified subscription associated with the device is a subscription of the network operator, if the identified subscription associated with the device is identified as a subscription with the network operator, assessing whether a profile and/or account associated with the subscription at the network operator allows the device to connect to the communication network, and if the profile and/or account allows connecting, allowing the device to connect to the communications network.

It will be appreciated that the profile and/or account may allow connecting by default. It is also possible that the profile and/or account only allows connecting if a condition is met, e.g. if debiting is enabled.

Thus, the system 1 includes the device 2 of the plurality of devices 2.i and a network entity 20 for connecting the device 2 to a communications network. In this example, the network entity 20 is embodied (or included) by the access network 16. In an Internet Protocol (IP) Multimedia Subsystems (IMS) application, the network entity 20, may e.g. be embodied by a Proxy Call Session Control Function (P-CSCF).

Figure 7:
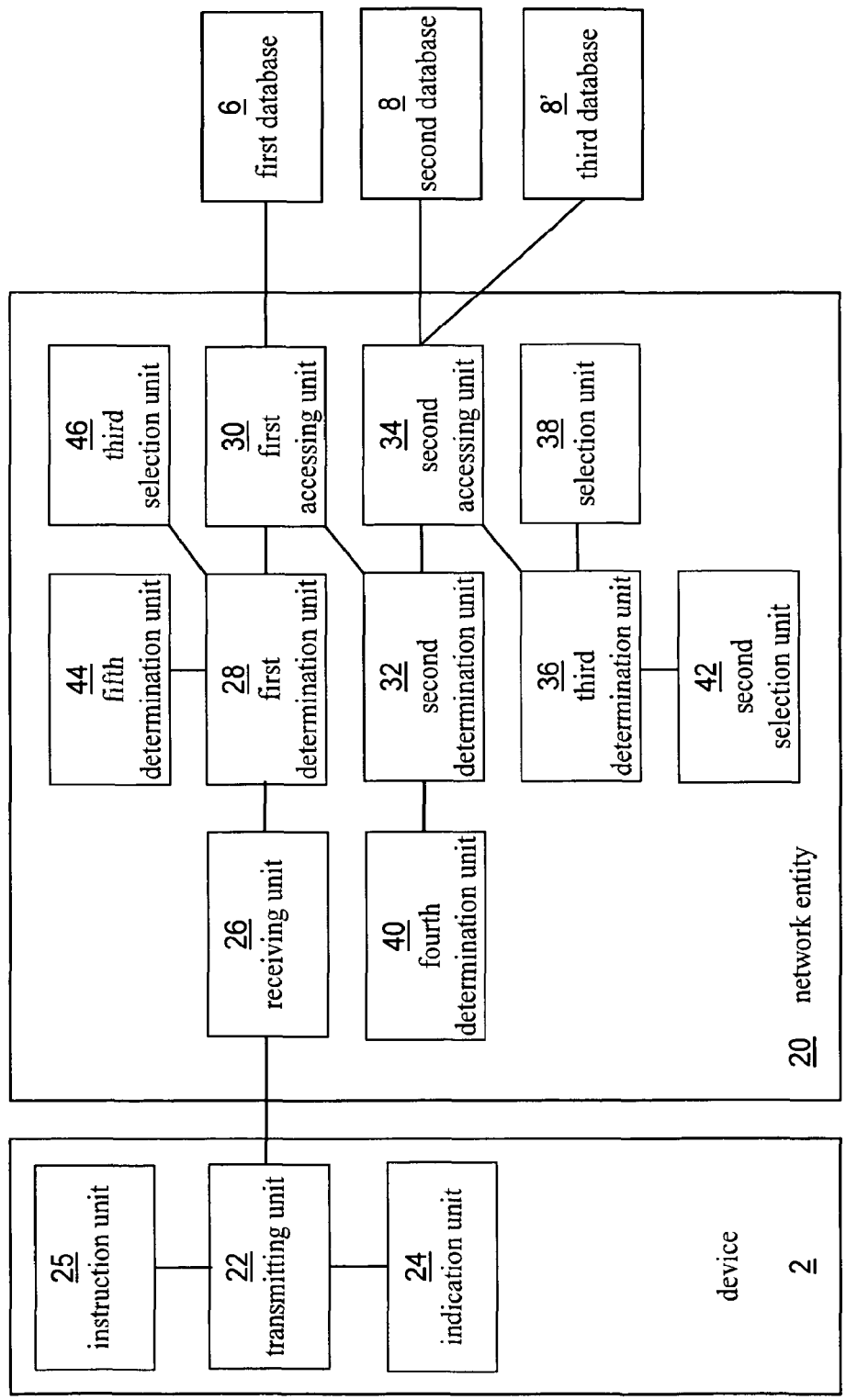
FIG. 7 is an embodiment of a communications network system.

Now, referring to FIG. 7, the system 1 including the device 2 of the plurality of devices 2.i and the network entity 20 for connecting the device 2 to a communications network is shown.

The device 2 includes a transmitting unit 22 arranged for transmitting an access attempt to the network entity. The device 2 also includes an indication unit 24 arranged for indicating an identification of the device 2 to the network entity. The identification of the device can be included in the access attempt.

The network entity 20 includes a receiving unit 26 arranged for receiving the access attempt from the device 2. The network entity 20 further includes a first determination unit 28 arranged for determining the identification of the device 2. The network entity 20 further includes a first accessing unit 30 arranged for accessing the first database 6 of the system 1, including for each device 2 of the plurality of devices 2.*i* an identification of at least one subscription associated therewith. The network entity further includes a second determination unit 32 arranged for determining from the first database 6 an identification of a subscription associated with the device 2.

The network entity 20 further includes a second accessing unit 34 arranged for accessing the second database 8 of the system, including for each subscription of a plurality of subscriptions an identification of at least one device associated therewith. The network entity further includes a third determination unit 36 arranged for determining whether the subscription identified from the first database 6 as being associated with the device 2 has the device 2 associated therewith in the second database 8. The network entity 20 further includes a selection unit 38 arranged for connecting the device 2 to the communications network if the third determination unit 36 determined that the identified subscription has the device 2 associated therewith, and for preventing the device 2 from connecting to the communications network if no identification of the device has been determined by the first determination unit 28, if no identification of a subscription associated with the device 2 has been determined from the first database 6, or if the identified subscription does not have the device 2 associated therewith in the second database 8. The selection unit 38 can further be arranged for preventing the device 2 from connecting to the communications network if a profile or an account of the identified subscription associated with the device 2 does not allow connecting the device 2 to the communications network.

In the above example, the network entity 20 can autonomously access the first and second databases 8, and determine whether or not to allow the device 2 to access the communications network, e.g. in response to receiving the access attempt from the device 2.

In an alternative embodiment, the device 2 further includes an instruction unit 25. The instruction unit 25 is arranged for instructing the network entity 20 to perform the steps of determining the identification of the device, accessing the first database 6, determining from the first database 6 the identification of a subscription associated with the device, accessing the second database 8, and determining whether the subscription identified from the first database 6 as being associated with the device 2 has the device associated therewith in the second database 8. The instruction unit 25 is also arranged to instruct the network entity 20 to perform the steps of allowing the device to connect to the communications network if the network determines that the identified subscription has the device associated therewith, and of preventing the device from connecting to the communications network if no identification of the device has been determined by the network entity, if no identification of a subscription associated with the device has been determined from the first database 6, or if the identified subscription does not have the device associated therewith in the second database 8. Optionally, the instruction unit 25 is also arranged to instruct the network entity 20 to perform the step of preventing the device from connecting to the communications network if a profile or an account of the identified subscription does not allow connecting the device to the communications network. It will be appreciated that the instruction unit can provide separate instructions for each of the above steps. Alternatively, the instruction unit can provide combined instructions for instructing the network entity to perform multiples steps in response to one combined instruction. The instruction unit can also provide one overall instruction for instructing the network entity to all above steps in response to the overall instruction (including or excluding the optional step, as desired).

In an embodiment the system 1 comprises a plurality of second databases 8.*i* (i=1, 2, 3, . . . ) each associated with one of a plurality of network operators. The network entity then comprises a fourth determination unit 40 arranged for determining the network operator associated with the identified subscription associated with the device 2, and a second selection unit 42 arranged for selecting the second database associated with the determined network operator from the plurality of second databases 8.*i* and for adjusting the second accessing unit 34 to access the second database 8 associated with the determined network operator.

In an embodiment the system 1 comprises a plurality of first databases 6.*i* each associated with one of a plurality of device group identifiers. Such device group identifier may be indicative of a producer of the device, a vendor of the device, a provider of the device, a type of device, a country in which the device is used, etc. The network entity 20 then comprises a fifth determination unit 44 arranged for determining a device group identifier of the connecting device, and a third selection unit 46 arranged for selecting the first database 6 associated with the determined device group identifier from the plurality of first databases 6.*i* and for instructing the first accessing unit 30 to access the first database 6 associated with the determined device group identifier. The device group identifier may e.g. be determined from the access attempt and/or from the identification of the device 2. The device identification may e.g. include a device group identifier such as a producer/vendor/provider-identification, a device type identification, a country indication etc.

It will be appreciated that the transmitting unit 22, indication unit 24, instruction unit 25 (and 39), receiving unit 26, first determination unit 28, first accessing unit 30, second determination unit 32, second accessing unit 34, third determination unit 36, selection unit 38, fourth determination unit 40, second selection unit 42, fifth determination unit 44, and third selection unit 46 can be embodied as dedicated electronic circuits, possibly including software code portions. The transmitting unit 22, indication unit 24, instruction unit 25 (and 39), receiving unit 26, first determination unit 28, first accessing unit 30, second determination unit 32, second accessing unit 34, third determination unit 36, selection unit 38, fourth determination unit 40, second selection unit 42, fifth determination unit 44, and third selection unit 46 can also be embodied as software code portions executed on, and e.g. stored in a memory of, a programmable apparatus such as a server in the communications network.

More in general, the system 1 includes the device 2 of the plurality of devices and a network entity 20 for connecting the device 2 to a communications network. The device 2 is arranged for attempting to access while providing an identification of the device to the network entity 20. The network entity 20 is arranged for receiving the access attempt from the device, and determining the identification of the device. The network entity is arranged for accessing the first database 6 of the system, including for each device 2 of the plurality of devices 2.*i* an identification of at least one subscription associated therewith, and for determining an identification of a subscription associated with the device. The network entity 20 is arranged for accessing the second database 8 of the system, including for each subscription of a plurality of subscriptions an identification of at least one device 2 associated therewith, and for determining whether the identified subscription is a subscription having the device 2 associated therewith in the second database. The network entity 20 is arranged for connecting the device to the communications network if the identified subscriber has the device associated therewith, and for preventing the device from connecting to the communications network if no identification of the device has been determined, if no identification of a subscription associated with the device has been determined, or if the identified subscription does not have the device associated therewith, and optionally preventing the device from connecting to the communications network if a profile and/or an account of the identified subscription associated with the device does not allow connecting the device to the communications network.

The system of FIG. 1 further includes a debiting database 14. In this example, the debiting database is associated with the network operator 12 of the subscription associated with the users mobile phone.

Also a method exists to debit an account, related to use of the device 2. Such method may be performed as follows. The identification of at least one subscription of the device 2 must be retrieved, based on the device identification, from the first database. Once the identification of the at least one subscription has been obtained, it can be verified with the network operator 12, from the second database 8, whether or not at least one of the determined subscriptions has the device 2 associated therewith in the second database, i.e to the knowledge of the network operator 12. If at least one of the identified subscriptions has the device 2 associated therewith in the second database 8, the account belonging to said user can be debited.

It is also possible that the device 2 has a credit associated therewith. This credit can be debited for use of the device. Preferably, the credit associated with the device 2 can be debited in any country where the device is provided. It is for instance possible that the credit associated with the device 2 is debited, until depleted, before an account belonging to the subscription associated with the device 2 is debited for use of the device 2. The credit associated with the device 2 can be seen as a preloaded credit, e.g. as a prepaid account associated with the subscription associated with the device 2.

In one embodiment, the first database 6 also contains an indication of the preloaded credit. This indication may form the preloaded account for use of the device 2. It can be a selection rule, that (while not depleted) this preloaded account should be used first (i.e. before an accounts belonging to the subscription is used).

In another embodiment third database 8' is used for this. This third database is maintained by, or on behalf of, the device producer/vendor. In this embodiment the second accessing unit 34, rather than accessing the second database 8, accesses the third database 8'. Selection rules can specify that this third database 8' should be accessed prior to accessing the second database 8. The third database 8' includes for each device 2 an indication of, a remaining amount of, a preloaded credit. From the third database 8' the second accessing unit retrieves an indication that the device 2 may be granted access to the communications network as long as the preloaded credit is not depleted. Once the second accessing unit 34 retrieves from the third database 8' an indication that the preloaded credit associated with the device 2 is depleted, the second accessing unit accesses the second database 8, and the method as described above with respect to the second database is continued.

In yet another embodiment, the credit associated with the device 2 may be transferred to the subscription associated with the device. It is for instance possible that this credit is transferred to a pre-paid account associated with said subscription. It is also possible that the credit is transferred to a post-paid account.

Figure 2:
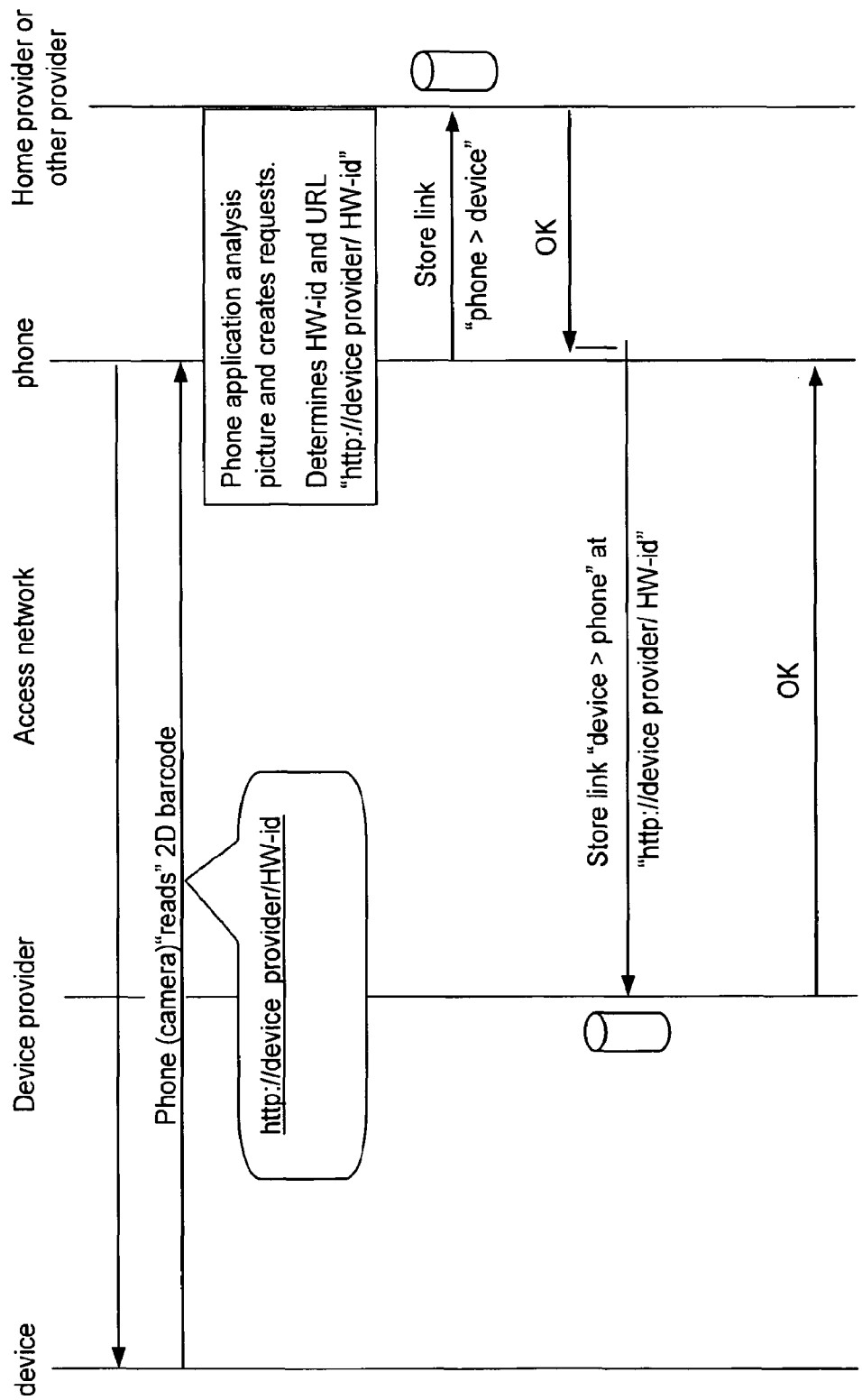
FIG. 2 is an embodiment of a connection method.

FIG. 2 shows a schematic representation of the user 4 associating his/her subscription to the device 2 by using his/her phone 10.1. Here, the phone 10.1 of the user 4 is used for providing the identification of the device 2 to the first database 6 and second database. In this example, the device 2 is provided with a 2D-barcode, e.g. printed on it, which contains the HW-id. Optionally, the device 2 contains a public key of the device 2, e.g. also included in the barcode. In this example, the user 4 uses a camera of his/her phone 10.1 to retrieve this information. An application in the phone 10.1 is used to communicate with the network operator 12 associated with the subscription of the user 4 relating to the phone 10.1. By communicating the device identification to the network operator 12, the second database 8 (connecting devices to subscriptions) may be updated to include the device 2 as being associated with the subscription of this user 4. The application in the phone 10.1 may also be used to communicate with the device provider. By communicating the device identification and subscription identification to the device provider 9, the first database 6 (connecting subscriptions to devices) may be updated to include the subscription as being associated with the device 2.

In this example, as the request to update the second database is made from the mobile phone, the network operator does not need additional authentication by the subscriber.

Figure 3:
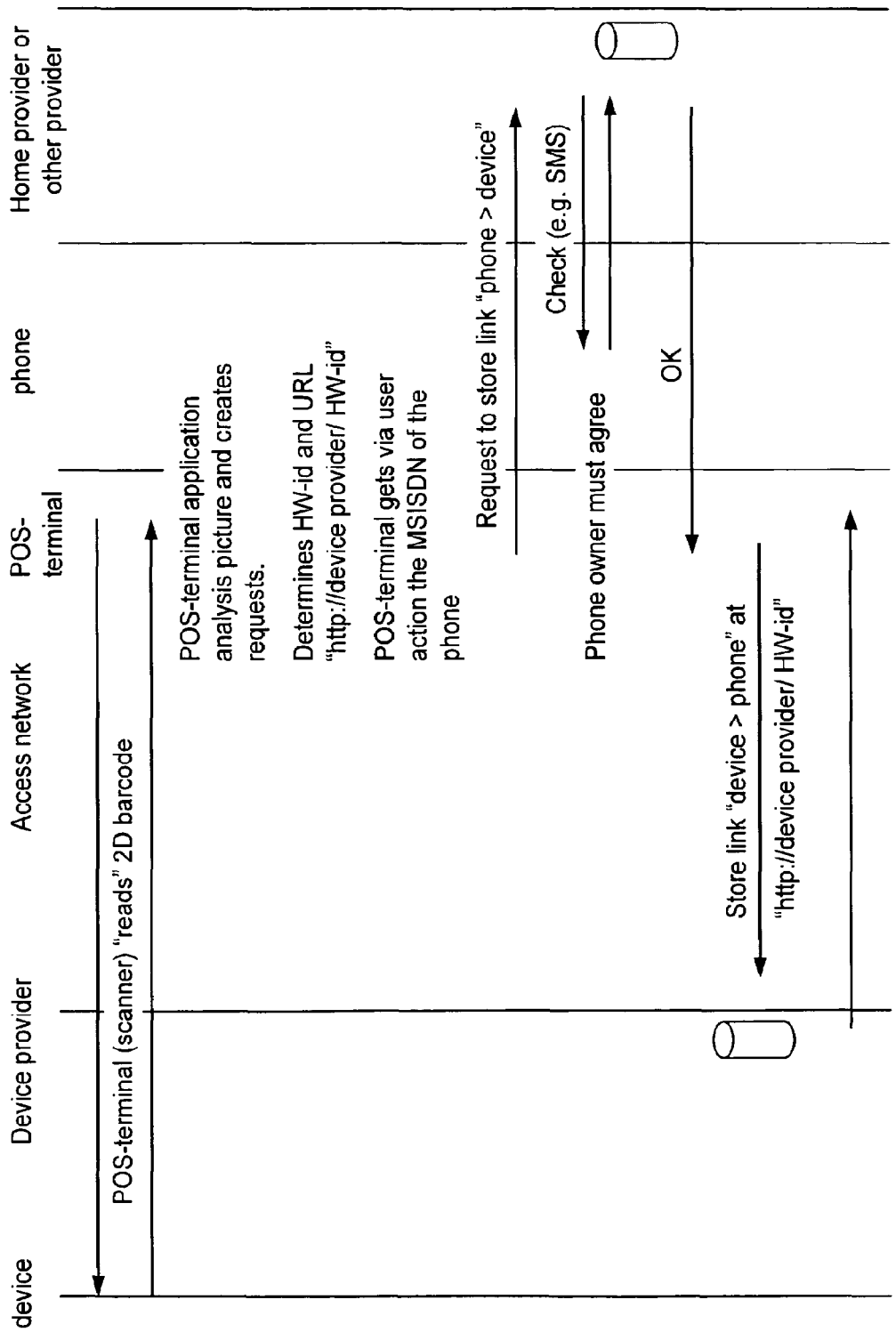
FIG. 3 is an embodiment of a connection method.

FIG. 3 shows a schematic representation of the user 4 associating his/her subscription to the device 2, by using a point-of-sales (POS) terminal 10.2. Here, the POS terminal 10.2 is used for providing the identification of the device 4 and subscription to the first database 6 and second database. In this example, the POS terminal 10.2 is used to scan the 2D-barcode of the device 4. A sales-person may e.g. enter an identification of the subscription, e.g. an MSISDN of the user's phone 10.1.

An application in the POS terminal 10.2 is used to communicate with the network operator associated with the entered MSISDN. By communicating the device identification and subscription identification to the network operator 12, the second database 8 (connecting devices to subscriptions) may be updated to include the device 2 as being associated with this subscription. The application in the POS terminal 10.2 may also be used to communicate with the device provider 9. By communicating the device identification and subscription identification to the device provider 9, the first database 6 (connecting subscriptions to devices) may be updated to include the subscription as being associated with this device 2. As the request to update the second database is not made from the mobile phone, the telecom provider may request approval from the subscriber, e.g. via SMS.

Figure 4:
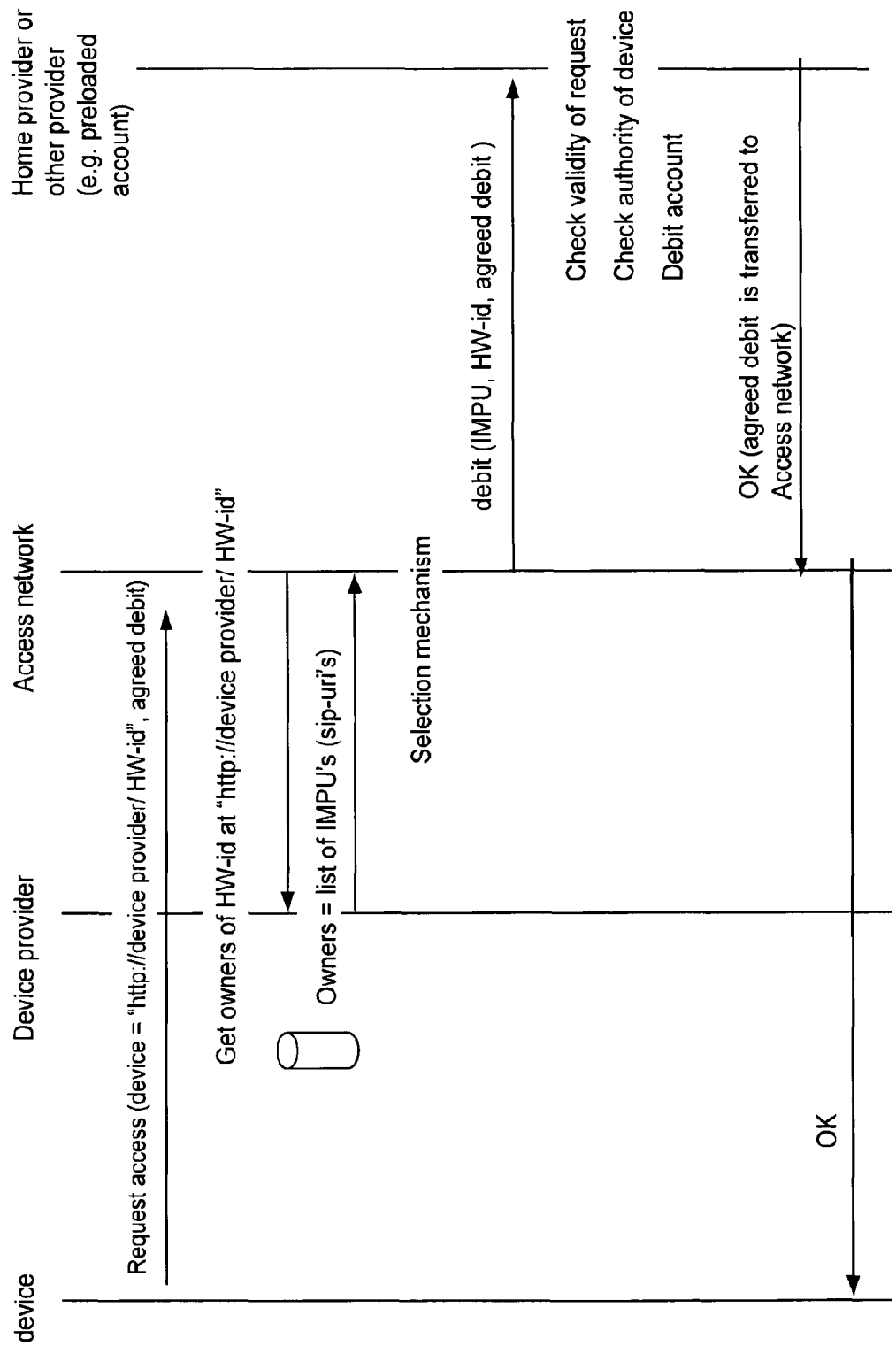
FIG. 4 is an embodiment of a connection method.

FIG. 4 shows a schematic representation of the device 2 obtaining internet access using its subscriptions credit.

The device 2 requests internet access via the Access Network 16. In the request, the device 2 indicates its own identification. The access network 16 recognizes the type of request, and knows the procedures and protocols to use, i.e. it knows how to contact the first database 6 and second database 8 and debiting database 14 and how to debit the account of the subscription. The access network 16 transmits the identification of the device 2 to the first database 6, and retrieves the identification of at least one subscription associated with the device 2. Next, the access network 16 verifies with the network operator 12 whether or not at least one of the subscriptions has the device 2 associated therewith in the second database 8. If at least one of the identified subscriptions has the device 2 associated therewith in the second database 8, the account belonging to said user can be debited, using the debiting database 14.

It will be appreciated that in practice the access network provider must have a (direct or indirect) business relation with the network operator that handles the account of the user. I.e. the access network provider must be able to retrieve the money that has been paid by the user. It is outside the scope of this invention to describe such a mechanism.

Figure 5:
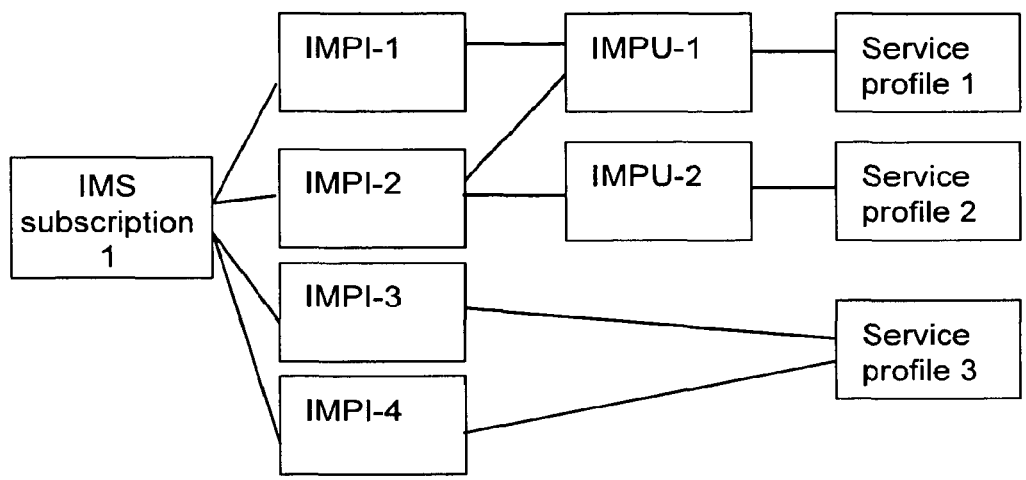
FIG. 5 is an embodiment of a communications network system.

FIG. 5 shows a first example of the invention applied in an Internet Protocol Multimedia Subsystem (IMS) communications network.

In the example of FIG. 5 the user 4 has a subscription, here IMS subscription 1. The user 4 has two Private User Identities (IMPI's), here IMPI-1 and IMPI-2 that are related to this subscription, e.g. two GSM phones. In FIG. 5, the user has two Public User Identities (IMPU's), here IMPU-1 and IMPU-2 that are related to these IMPI's, e.g. a Session Initiation Protocol Uniform Resource Identifier (SIP-URI) and a telephone Uniform Resource Identifier (tel-URI) at which the phone(s) of this user 4 can be reached.

In the example of FIG. 5, the user 4 associates his/her subscription with two devices, here identified by IMPI-3 and IMPI-4. The user 4 connects these devices to one of his phones, identified by an IMPU or IMPI, i.e. establishes a relation between a phone and these devices. For instance, the user associates the devices with his phone identified by IMPI-1. Here, the first database 6 now specifies that IMPI-4, i.e. the HW-id of one of the devices, is connected to IMPU-1. It will be appreciated that IMPU-1 is a public identifier, that can be traced to an IMS subscription associated with IMPI-1. In the Home Subscriber Server (HSS) IMPI-1, IMPI-2, IMPI-3 and IMPI-4 are connected to the subscription of the user. Thus, the HSS functions as second database in this example.

Figure 6:
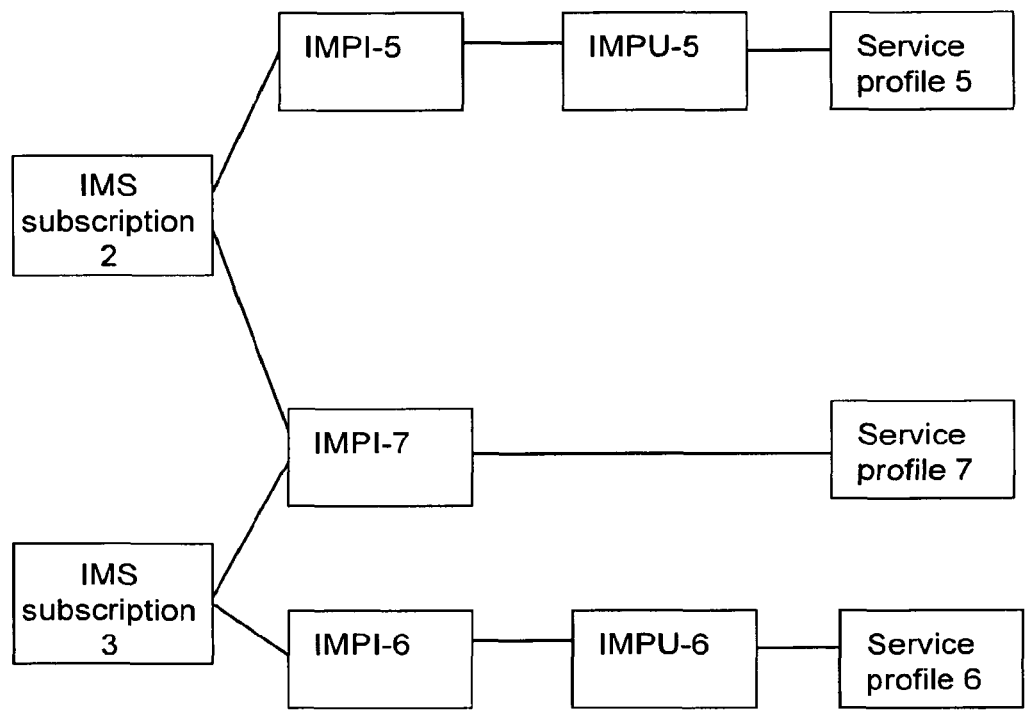
FIG. 6 is an embodiment of a communications network system.

FIG. 6 shows a second example of the invention applied in an IMS communications network. In this example, two users 4 each have a subscription, IMS subscription 2 and IMS subscription 3, respectively. Each user 4 has one IMPI (IMPI-5 and IMPI-6, respectively) that is related to his/her subscription. Each user has one IMPU (IMPU-5 and IMPU-6, respectively) that is related to the respective IMPI. Both users jointly associate their subscriptions with the device 2 identified by IMPI-7. Both users associate this device to their phones (identified by IMPI-5 and IMPI-6, respectively). Thus, both users 4 establishes a relation between their phone and this device. In the HSS, acting as second database, IMPI-5 and IMPI-7 are connected to the subscription of the one user and IMPI-6 and IMPI-7 are connected to the subscription of the other user.

The first database 6 specifies that IMPI-7 (the HW-id of the device) is connected to IMPU-5 and IMPU-6 (both being public identifiers, that can be traced to IMS subscriptions of the two users).

It will be appreciated that wireless devices 2, such as IMPI-4, may not have an IMPU associated therewith, so they can't be called, but they can have service profiles, to specify the charging rules. The wireless device 2, such as IMPI-4, can be related to more than one subscription in the same network (e.g., within the same HSS).

Optionally, the wireless devices 2 can be identified by a new type of identifier, which behaves almost like an IMPI both with minor differences (as described above).

Within an IMS embodiment, the Resource List Server (RLS) is a possible entity to implement the function of first database 6. Existing Extensible Markup Language (XML) Configuration Access Protocol (XCAP) methods, as supported by RLS, can be used to read and write the data about relation from device to user(s).

Within an IMS embodiment, the HSS is the preferred entity to implement the function of second database 8. Internally in the HSS, the standard HSS mechanism to connect IMPI's and IMPU's can be used. Externally, the HSS must support a new method via which an entity can request to create a relation between a phone (identified by IMPU or IMPI) and a device 2.

Within an IMS embodiment, the Charging and Billing System is the preferred entity to implement a debit interface. An existing Ro-interface can be used for this. If needed, accessed via a wrapper function which limits the use of the interface to what is needed for this use case. The operations Credit Control request (CCR) Balance Check (to check credit for this specific wireless device) and CCR Direct Debiting (to debit the users account) are used. The parameter Subscription-Id-Data identifies the end-user (IMS subscription), so some IMPU is used. The parameter User-Equipment-Info identifies the device 2 that wants to debit the end-users account. Some IMPI is used. The IMPI (format of user realm) is very flexible scalable.

Figure 8:
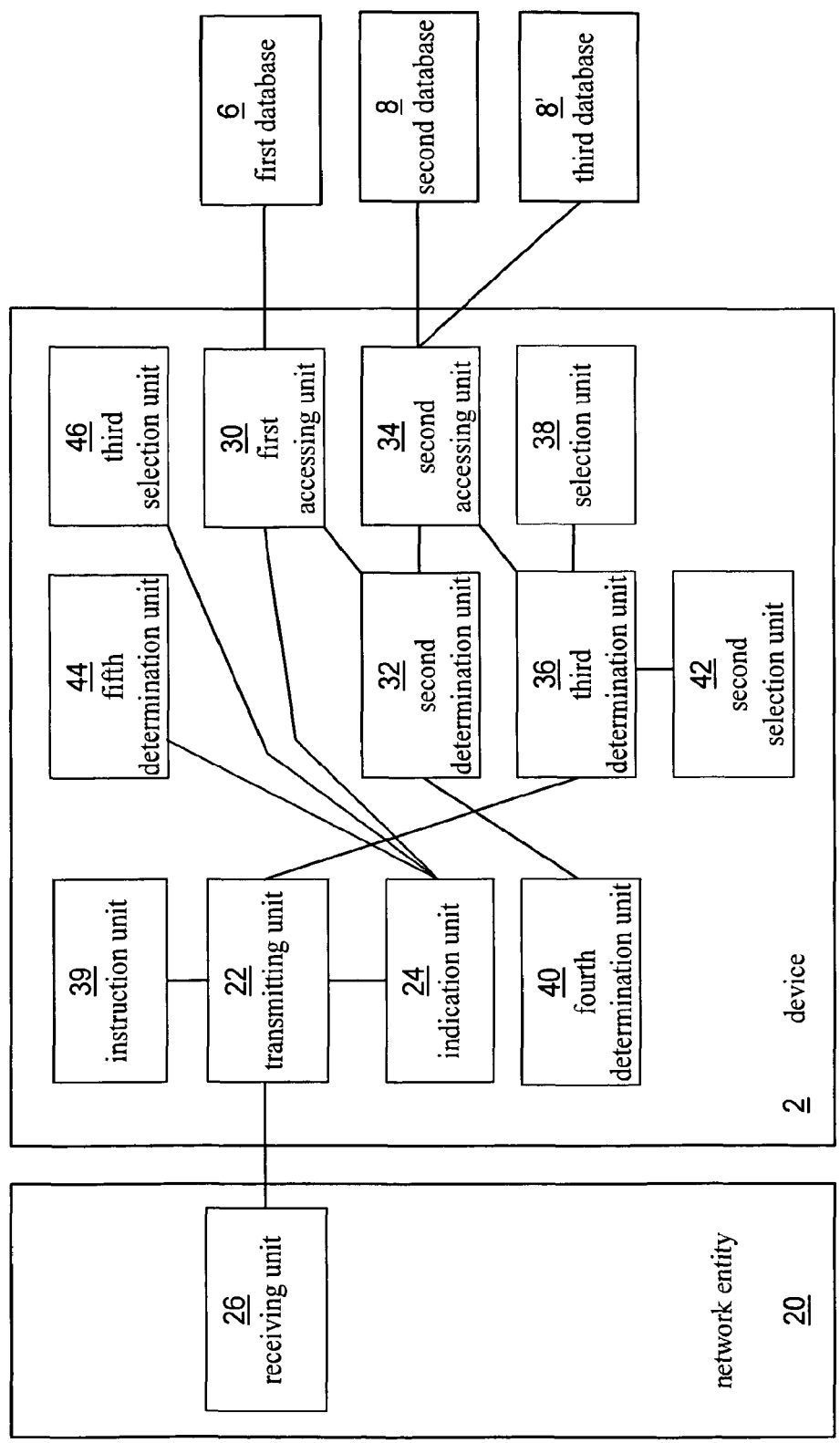
FIG. 8 is an embodiment of a communications network system.

FIG. 8 shows an alternative embodiment of a system 1 including a device 2 of a plurality of devices and a network entity 20 for connecting the device to a communications network.

In this example, the device 2 again includes the transmitting unit 22 and the indication unit 24 as explained with respect to FIG. 7. The device also includes an instruction unit designated with reference numeral 39. In this example, the device 2 further includes the first accessing unit 30 arranged for accessing the first database 6, the second determination unit 32 arranged for determining from the first database 6 the identification of a subscription associated with the device, the second accessing unit 34 arranged for accessing the second database 8, and the third determination unit 36 arranged for determining whether the subscription identified from the first database 6 as being associated with the device 2 has the device associated therewith in the second database (8). Hence, the second determination unit 32 determines from the first database 6 the identification of a subscription associated with the device, on the basis of the device identification generated by the indication unit 24. The third determination unit 36 determines whether the subscription identified from the first database 6 as being associated with the device 2 has the device associated therewith in the second database (8). The instruction unit 39 arranged for instructing the network entity 20 to allow the device to connect to the communications network if the third determination unit (36) determines that the identified subscription has the device associated therewith, and to prevent the device from connecting to the communications network if no identification of the device has been determined by the first determination unit (28), if no identification of a subscription associated with the device has been determined from the first database (6), if the identified subscription does not have the device associated therewith in the second database (8), or if a profile or an account of the identified subscription does not allow connecting the device to the communications network.

It will be appreciated that in the embodiment of FIG. 8, the device 2 plays an active role in determining whether or not the device is allowed to access the communications network.

In the foregoing specification, the invention has been described with reference to specific examples of embodiments of the invention. It will, however, be evident that various modifications and changes may be made therein without departing from the broader spirit and scope of the invention as set forth in the appended claims.

When a Service Profile is connected to an IMPI, this Service Profile can contain rules on how the device 2 may be used in connection with the associated subscription. The Service Profile can for instance specify whether or not use of the device 2 should be debited in connection with the associated subscription. The Service Profile can e.g. contain rules on how the device 2 may use the account associated with the subscription. There can e.g. be settings on maximum debit per month, maximum debit per access. It is also possible that the Service Profile contains rules on a maximum number of devices to be associated with the subscription, or rules preventing use of (certain predetermined classes of) devices in connection with said subscription.

The first database 6 can contain more than one subscription for a device 2. This means that, when an account must be debited, selection rules are needed on which account to debit. Such selection rules can e.g. be round-robin, random, split-payment, etc.

The first database 6 can contain more than one subscription for a device 2. Subscribers can connect their subscriptions to devices themselves, according to the basic embodiment. Optionally, a procedure can exist to disconnect a subscription from a device in the first database 6.

When a device 2 allows the access network to debit an account, the node that maintains the account may need proof of the authenticity of the request. Optionally, the system is able to verify the originator of the request (the HW-device) and/or is able to verify that the mentioned amount to be debited is approved by the originator of the request. This can be achieved by signing the request, e.g. encrypting it with a private key.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system including a device of a plurality of devices and a network node for connecting the device to at least one communications network, the device comprising a processor and a memory having instructions for execution by the processor to cause a transmitter to transmit an access attempt to the network node with an indication of an identification of the device to the network node, the network node including a processor and a memory having instructions for execution by the processor to:
cause a receiver to receive the access attempt from the device,
determine the identification of the device,
access a first database maintained by vendor of the device, said first database including for each device of the plurality of devices an identification of at least one subscription to a communications network associated therewith,
determine from the first database the identification of a subscription to a communications network associated with the device,
access a third database maintained by a vendor of the device, said third database including a plurality of records for a plurality of devices, respectively, each one of the plurality of records for a device including credit information associated with the device,
determine from the credit information a credit associated with the device,
access a second database maintained by network operator of the device, said second database including a plurality of records for a plurality of subscriptions respectively, each one of the plurality of records for a subscription including a relationship between the subscription and an identification of at least one device associated therewith,
determine whether the subscription identified from the first database is present in the second database and whether that subscription is associated with the device in the second database, and
connect the device to the communications network if the processor determines that the credit associated with the device is sufficient and that the identified subscription to the communications network from the first database is present in the second database and is associated with the device in the second database, and
prevent the device from connecting to the communications network, if the device has been determined not to have an association identified subscription in the first database, that the credit associated with the device is depleted in the third database, or that the identified subscription to the communications network does not have the device associated therewith in the second database.

2. The system according to claim 1, wherein the system further includes:
a plurality of second databases each associated with one of a plurality of network operators, and
wherein the network node processor is further configured to:
determine the network operator associated with the subscription identified as associated with the device from the first database,
select the second database associated with the determined network operator from the plurality of second databases, and
access the second database associated with the determined network operator.

3. The system according to claim 1, wherein the system further includes:
a debiting database maintained by network operator of the device, said debiting database including a plurality of records for a plurality of devices respectively, each one of the plurality of records for a device including a relationship between the device and an account of the identified subscription associated therewith, wherein the network node processor is further configured to:
determine from the debiting database an account of the identified subscription associated with the device, and
assess whether a network operator associated with the identified subscription is servicing, or has a roaming agreement with, the communications network, and optionally debit the account of the subscription associated with the device for connection of the device with the communications network.

4. The system according to claim 1, wherein the identification of the device is indicated to the network node by a phone.

5. The system according to claim 1, wherein the identification of the device is indicated to the network node by a point-of-sales (POS) terminal.

6. The system according to claim 1, wherein the identification of the device is indicated to the network node by a computer.

7. A network node for connecting a device of a plurality of devices to a communications network, the network node comprising:
a receiver configured to receive an access attempt from the device,
a processor system comprising a processor and a memory, the processor system being configured to:
determine an identification of the device from the access attempt,
access a first database maintained by vendor of the device, said first database including for each device of the plurality of devices an identification of at least one subscription to one communications network associated therewith,
determine from the first database the identification of a subscription to the communications network associated with the device,
access a third database maintained by a vendor of the device, said third database including a plurality of records for a plurality of devices, respectively, each one of the plurality of records for a device including credit information associated with the device,
determine from the third database a credit associated with the device,
access a second database maintained by network operator of the device, said second database including a plurality of records for a plurality of subscriptions respectively, each one of the plurality of records for a subscription including a relationship between the subscription and an identification of at least one device associated therewith,
determine whether the subscription identified from the first database as being associated with the device has the device associated therewith in the second database,
connect the device to the communications network in response to a determination that the credit associated with the device is sufficient and the identified subscription to the communications network from the first database is present in the second database and is associated with the device in the second database, and
prevent the device from connecting to the communications network if no identification of the device has been determined, if the device has been determined not to have an association identified subscription in the first database, if the credit associated with the device is depleted, or if the identified subscription to the communications network does not have the device associated therewith in the second database.

8. The network node according to claim 7, wherein the processor system is further configured to:
determine the network operator associated with the identified subscription associated with the connecting device, and
select the second database associated with the determined network operator from a plurality of second databases each associated with one of a plurality of network operators.

9. The network node according to claim 7, wherein the processor system is further configured to:
access a debiting database maintained by network operator of the device, said debiting database including a plurality of records for a plurality of devices respectively, each one of the plurality of records for a device including a relationship between the device and an account of the identified subscription associated therewith,
determine from the debiting database an account of the identified subscription associated with the device, and
assess whether a network operator associated with the identified subscription is servicing, or has a roaming agreement with, the communications network, and optionally debit the account of the subscription associated with the device for connection of the device with the communications network.

10. A device configured to connect to a communications network, the device comprising:
a transmitter configured to transmit an access attempt to a network node of the communications network, and
a processor system comprising a processor and a memory, the processor system being configured to:
indicate an identification of the device to the network node, and
instruct the network node to
determine the identification of the device,
access a first database maintained by vendor of the device, said first database including for each device of a plurality of devices an identification of at least one subscription to one communications network associated therewith,
determine from the first database the identification of a subscription to the communications network associated with the device,
access a third database maintained by a vendor of the device, said third database including a plurality of records for a plurality of devices, respectively, each one of the plurality of records for a device including a credit associated with the device,
determine from the third database a credit associated with the device,
access a second database maintained by network operator of the device, said second database including a plurality of records for a plurality of subscriptions respectively, each one of the plurality of records for a subscription including a relationship between the subscription and an identification of at least one device associated therewith,
determine whether the subscription identified from the first database as being associated with the device has the device associated therewith in the second database,
allow the device to connect to the communications network if the network determines that the credit associated with the device is sufficient and the identified subscription to the communications network from the first database is present in the second database and is associated with the device in the second database, and prevent the device from connecting to the communications network if no identification of the device has been determined by the network node, if the device has been determined not to have an association identified subscription in the first database, the credit associated with the device is depleted, or the identified subscription to the communications network does not have the device associated therewith in the second database.

11. The device according to claim 10, wherein the processor system is further configured to:

determine the network operator associated with the identified subscription associated with the connecting device, and select the second database associated with the determined network operator from a plurality of second databases each associated with one of a plurality of network operators.

12. The device according to claim 10, wherein the processor system is further configured to:

access a debiting database maintained by network operator of the device, said debiting database including a plurality of records for a plurality of devices respectively, each one of the plurality of records for a device including a relationship between the device and an account of the identified subscription associated therewith, determine from the debiting database an account of the identified subscription associated with the device, and assess whether a network operator associated with the identified subscription is servicing, or has a roaming agreement with, the communications network, and optionally debit the account of the subscription associated with the device for connection of the device with the communications network.

* * * * *